United States Patent
Smith

(10) Patent No.: US 10,320,816 B1
(45) Date of Patent: Jun. 11, 2019

(54) SYSTEMS AND METHODS FOR UNIQUELY IDENTIFYING MALICIOUS ADVERTISEMENTS

(71) Applicant: Symantec Corporation, Mountain View, CA (US)

(72) Inventor: Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 315 days.

(21) Appl. No.: 15/185,104

(22) Filed: Jun. 17, 2016

(51) Int. Cl.
- *H04L 29/06* (2006.01)
- *G06F 16/951* (2019.01)
- *G06Q 30/02* (2012.01)
- *G06F 21/56* (2013.01)

(52) U.S. Cl.
CPC ........ *H04L 63/1416* (2013.01); *G06F 16/951* (2019.01); *G06Q 30/0277* (2013.01); *H04L 63/1433* (2013.01); *G06F 21/56* (2013.01); *G06Q 30/0241* (2013.01); *G06Q 30/0248* (2013.01); *H04L 63/14* (2013.01); *H04L 63/145* (2013.01)

(58) Field of Classification Search
CPC . H04L 63/14; H04L 63/1416; H04L 63/1433; H04L 63/145; H04L 29/06; G06F 21/56; G06F 17/30864; G06F 16/951; G06Q 30/0241; G06Q 30/0248; G06Q 30/0277; G06Q 30/02
See application file for complete search history.

(56) References Cited

U.S. PATENT DOCUMENTS

| | | | | |
|---|---|---|---|---|
| 9,298,919 B1* | 3/2016 | Demir | ................... | H04L 67/20 |
| 9,578,044 B1* | 2/2017 | Sharma | ............... | H04L 63/1416 |
| 2011/0208862 A1* | 8/2011 | Maffione | ................. | H04L 67/22 709/224 |
| 2015/0281258 A1* | 10/2015 | Watkins | ............. | G06Q 30/0277 726/23 |

* cited by examiner

*Primary Examiner* — Jayesh M Jhaveri
(74) *Attorney, Agent, or Firm* — FisherBroyles, LLP

(57) ABSTRACT

The disclosed computer-implemented method for uniquely identifying malicious advertisements may include (1) associating, by a browser advertisement platform, a browser advertisement with a unique identifier for the browser advertisement, (2) transmitting, by the browser advertisement platform, the browser advertisement to be displayed on at least one endpoint computing device in conjunction with the unique identifier, (3) receiving, at the browser advertisement platform, a message from the endpoint computing device that includes the unique identifier and that indicates that the browser advertisement was associated with malicious activity on the endpoint computing device, and (4) performing, by the browser advertisement platform, a security action on the browser advertisement in response to the message indicating that the browser advertisement with the unique identifier was associated with the malicious activity. Various other methods, systems, and computer-readable media are also disclosed.

21 Claims, 8 Drawing Sheets

SYSTEMS AND METHODS FOR UNIQUELY IDENTIFYING MALICIOUS ADVERTISEMENTS

BACKGROUND

Advertisement fraud and malicious advertising are two of the most prevalent forms of malicious activity on the internet. While advertisement technology (ad tech) companies and security vendors are fighting these attacks, their efforts are often disjointed. One case where this is apparent is the inability to match up information about a threat detection from a security vendor on a control point (e.g., an endpoint or a gateway appliance) with information about a specific advertisement impression delivery by an ad tech partner. If security vendors and ad tech companies were able to match up this data, it would enable ad tech companies to identify with certainty which of their advertisements were known to be associated with the delivery of malware, allowing ad tech companies to remove such malicious advertisements from circulation and possibly take additional actions to ensure that future advertisements are not malicious.

Unfortunately, traditional products for detecting malicious advertisements may not be capable of relaying accurate information to the ad tech company about which advertisement specifically was flagged as malicious. Additionally, traditional systems for displaying advertisements may not be designed with identification of the advertisements by third-party applications in mind. Accordingly, the instant disclosure identifies and addresses a need for additional and improved systems and methods for uniquely identifying malicious advertisements.

SUMMARY

As will be described in greater detail below, the instant disclosure describes various systems and methods for uniquely identifying malicious advertisements by associating each advertisement transmitted by an advertisement platform with a unique identifier that can be used by security applications to inform the advertisement platform about malicious activity linked to the uniquely identified advertisement.

In one example, a computer-implemented method for uniquely identifying malicious advertisements may include (1) associating, by a browser advertisement platform, a browser advertisement with a unique identifier for the browser advertisement, (2) transmitting, by the browser advertisement platform, the browser advertisement to be displayed on at least one endpoint computing device in conjunction with the unique identifier, (3) receiving, at the browser advertisement platform, a message from the endpoint computing device that includes the unique identifier and that indicates that the browser advertisement was associated with malicious activity on the endpoint computing device, and (4) performing, by the browser advertisement platform, a security action on the browser advertisement in response to the message indicating that the browser advertisement with the unique identifier was associated with the malicious activity.

In one example, the security action may include preventing the browser advertisement from being transmitted to additional endpoint computing devices. In some embodiments, receiving the message from the endpoint computing device may include receiving a message from an endpoint protection application on the endpoint computing device that determined that the browser advertisement was associated with the malicious activity. In these embodiments, performing the security action may include sending information about the browser advertisement to a security vendor that distributes the endpoint protection application.

In one embodiment, the message may include an identifier of the endpoint protection application. In some examples, the computer-implemented method may further include receiving, at the browser advertisement platform, from a gateway device that transmitted the browser advertisement to the computing device, an additional message that may include the unique identifier and that indicates that the browser advertisement is potentially malicious.

In some examples, transmitting the browser advertisement to be displayed on the endpoint computing device in conjunction with the unique identifier may include transmitting a unique identifier of the browser advertisement platform in conjunction with the browser advertisement. Additionally or alternatively, transmitting the browser advertisement to be displayed on the endpoint computing device in conjunction with the unique identifier may include transmitting computer-readable code that includes the browser advertisement and a tag that includes the unique identifier.

In one embodiment, the computer-implemented method may further include providing, by the browser advertisement platform, an application programming interface (API) that includes information intended to enable security applications to detect the unique identifier. In one example, the computer-implemented method may further include receiving, at the browser advertisement platform, an additional message from the endpoint computing device that includes the unique identifier and that includes additional information about how the browser advertisement interacted with the computing device.

In one embodiment, the computer-implemented method may further include (1) identifying, by an endpoint protection application on the endpoint computing device, the browser advertisement, (2) extracting, by the endpoint protection application, the unique identifier from the browser advertisement, (3) detecting, by the endpoint protection application, the malicious activity on the endpoint computing device, (4) determining, by the endpoint protection application, that the browser advertisement is associated with the malicious activity on the endpoint computing device, and (5) sending, by the endpoint protection application, the message to the browser advertisement platform that includes the unique identifier of the browser advertisement and that indicates that the browser advertisement was associated with malicious activity on the endpoint computing device.

In one embodiment, a system for implementing the above-described method may include (1) an association module, stored in memory, that associates, by a browser advertisement platform, a browser advertisement with a unique identifier for the browser advertisement, (2) a transmission module, stored in memory, that transmits, by the browser advertisement platform, the browser advertisement to be displayed on at least one endpoint computing device in conjunction with the unique identifier, (3) a receiving module, stored in memory, that receives, at the browser advertisement platform, a message from the endpoint computing device that includes the unique identifier and that indicates that the browser advertisement was associated with malicious activity on the endpoint computing device, (4) a security module, stored in memory, that performs, by the browser advertisement platform, a security action on the browser advertisement in response to the message indicating that the browser advertisement with the unique identifier was associated with the malicious activity, and (5) at least one physical processor configured to execute the association module, the transmission module, the receiving module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) associate, by a browser advertisement platform, a browser advertisement with a unique identifier for the browser advertisement, (2) transmit, by the browser advertisement platform, the browser advertisement to be displayed on at least one endpoint computing device in conjunction with the unique identifier, (3) receive, at the browser advertisement platform, a message from the endpoint computing device that includes the unique identifier and that indicates that the browser advertisement was associated with malicious activity on the endpoint computing device, and (4) perform, by the browser advertisement platform, a security action on the browser advertisement in response to the message indicating that the browser advertisement with the unique identifier was associated with the malicious activity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
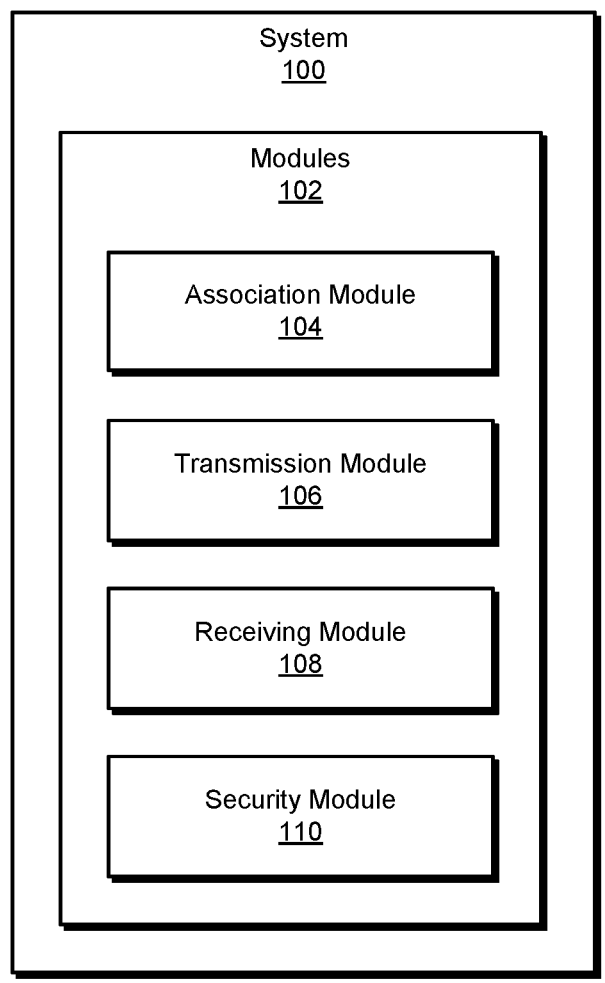
FIG. 1 is a block diagram of an example system for uniquely identifying malicious advertisements.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for uniquely identifying malicious advertisements. As will be explained in greater detail below, by including unique identifiers in pre-defined locations associated with browser advertisements, ad tech companies and other browser advertisement platforms may be able to receive accurate and useful feedback about specific advertisements, such as malicious activity associated with the advertisement, legitimate views of the advertisement, and/or false positive accusations of malicious activity associated with the advertisement.

The following will provide, with reference to FIGS. 1, 2, 4, and 5, detailed descriptions of example systems for uniquely identifying malicious advertisements. Detailed descriptions of corresponding computer-implemented methods will also be provided in connection with FIGS. 3 and 6. In addition, detailed descriptions of an example computing system and network architecture capable of implementing one or more of the embodiments described herein will be provided in connection with FIGS. 7 and 8, respectively.

FIG. 1 is a block diagram of example system 100 for uniquely identifying malicious advertisements. As illustrated in this figure, example system 100 may include one or more modules 102 for performing one or more tasks. For example, and as will be explained in greater detail below, example system 100 may include an association module 104 that associates, by a browser advertisement platform, a browser advertisement with a unique identifier for the browser advertisement. Example system 100 may additionally include a transmission module 106 that transmits, by the browser advertisement platform, the browser advertisement to be displayed on at least one endpoint computing device in conjunction with the unique identifier. Example system 100 may also include a receiving module 108 that receives, at the browser advertisement platform, a message from the endpoint computing device that includes the unique identifier and that indicates that the browser advertisement was associated with malicious activity on the endpoint computing device. Example system 100 may additionally include a security module 110 that performs, by the browser advertisement platform, a security action on the browser advertisement in response to the message indicating that the browser advertisement with the unique identifier was associated with the malicious activity. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or endpoint computing device 206), computing system 710 in FIG. 7, and/or portions of example network architecture 800 in FIG. 8. One or more of modules 102 in FIG. 1 may also represent all or portions of one or more special-purpose computers configured to perform one or more tasks.

Figure 2:
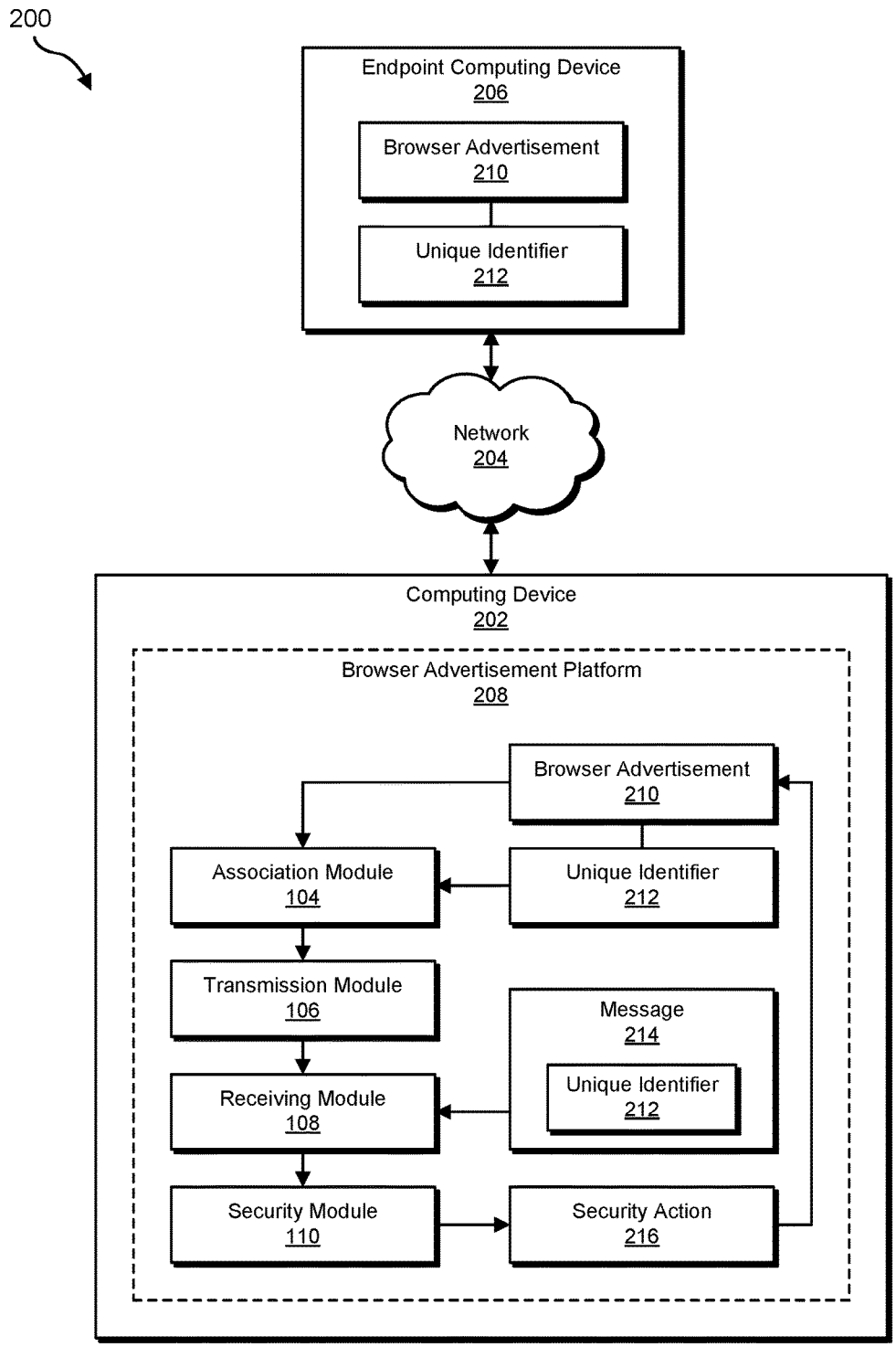
FIG. 2 is a block diagram of an additional example system for uniquely identifying malicious advertisements.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with an endpoint computing device 206 via a network 204. In one example, computing device 202 may be programmed with one or more of modules 102.

In one embodiment, one or more of modules 102 from FIG. 1 may, when executed by at least one processor of computing device 202, enable computing device 202 to uniquely identify malicious advertisements. For example, and as will be described in greater detail below, association module 104 may associate, by a browser advertisement platform 208, a browser advertisement 210 with a unique identifier 212 for browser advertisement 210. Afterwards, on any number of occasions, transmission module 106 may transmit, by browser advertisement platform 208, browser advertisement 210 to be displayed on at least one endpoint computing device 206 in conjunction with unique identifier 212. At some later time, receiving module 108 may receive, at browser advertisement platform 208, a message 214 from endpoint computing device 206 that includes unique identifier 212 and that indicates that browser advertisement 210 was associated with malicious activity on endpoint computing device 206. Immediately or eventually afterwards, security module 110 may perform, by browser advertisement platform 208, a security action 216 on browser advertisement 210 in response to message 214 indicating that browser advertisement 210 with unique identifier 212 was associated with the malicious activity.

Computing device 202 generally represents any type or form of computing device that is capable of storing and/or transmitting browser advertisements. Examples of computing device 202 include, without limitation, application servers and database servers configured to provide various database services and/or run certain software applications.

Endpoint computing device 206 generally represents any type or form of computing device capable of reading computer-executable instructions. Examples of endpoint computing device 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, example computing system 710 in FIG. 7, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), example network architecture 800 in FIG. 8, or the like. Network 204 may facilitate communication or data transfer using wireless or wired connections. In one embodiment, network 204 may facilitate communication between computing device 202 and endpoint computing device 206.

Figure 3:
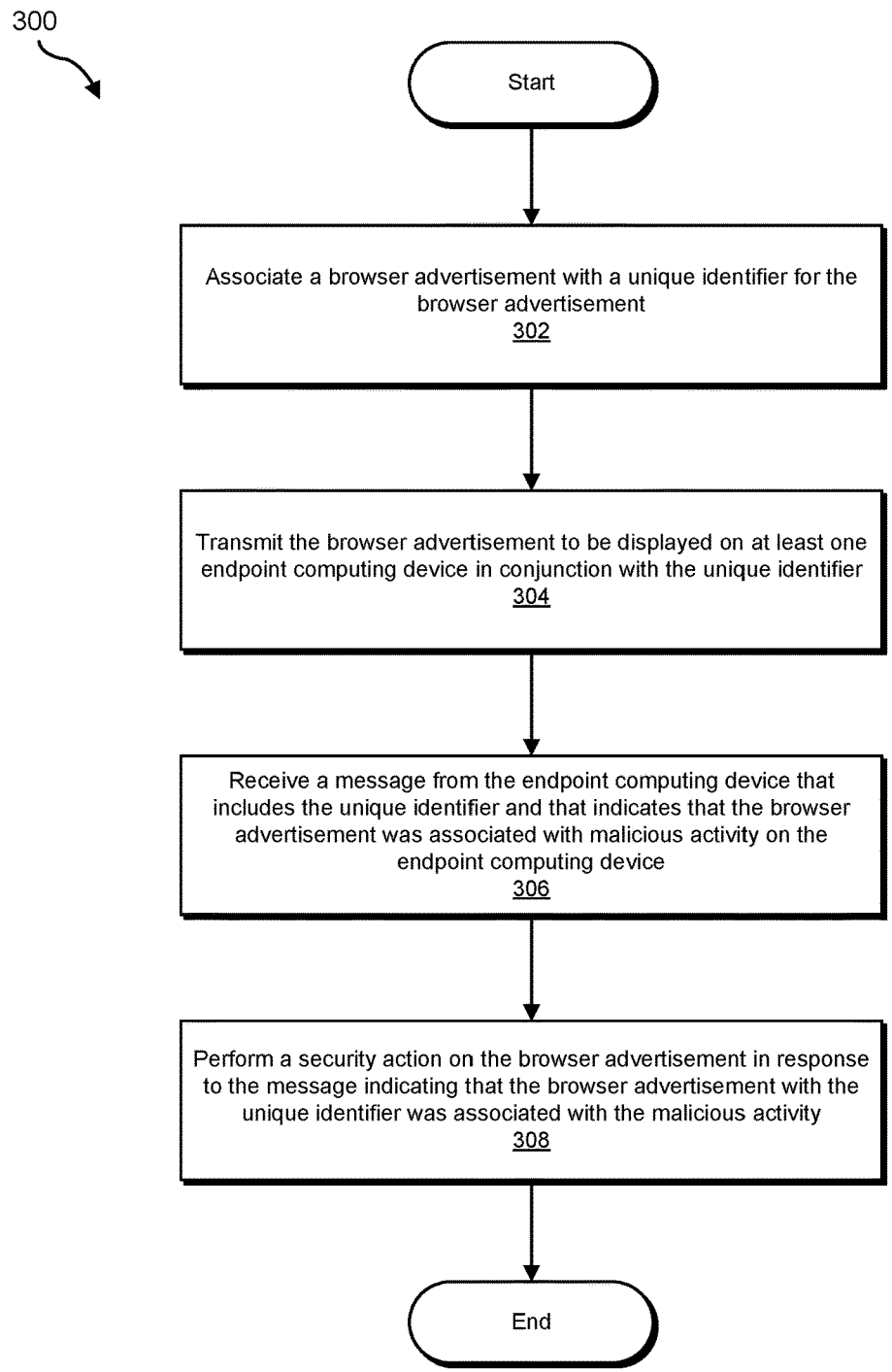
FIG. 3 is a flow diagram of an example method for uniquely identifying malicious advertisements.

FIG. 3 is a flow diagram of an example computer-implemented method 300 for uniquely identifying malicious advertisements. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of example network architecture 800 in FIG. 8.

As illustrated in FIG. 3, at step 302, one or more of the systems described herein may associate, by a browser advertisement platform, a browser advertisement with a unique identifier for the browser advertisement. For example, association module 104 may, as part of computing device 202 in FIG. 2, associate, by browser advertisement platform 208, browser advertisement 210 with unique identifier 212 for browser advertisement 210.

The term "browser advertisement," as used herein, generally refers to any text, image, and/or video that is intended to be displayed by an application capable of browsing the Internet and to advertise a product, service, event, and/or other item. Examples of a browser advertisement may include, without limitation, a sponsored link, a banner advertisement, a pop-up advertisement, and/or a promoted post. In some embodiments, a browser advertisement may be displayed on a third-party website that is not owned by the browser advertisement platform that originated the advertisement. For example, a browser advertisement may include a paid advertisement that is displayed by a search engine alongside organic search results. In another example, a browser advertisement may include an animated banner displayed at the top of a web page.

The term "browser advertisement platform," as used herein, generally refers to any server, application, computing device, network, and/or combination of the aforementioned that creates, distributes, sells, and/or transmits browser advertisements. In some embodiments, an ad tech company may operate one or more browser advertisement platforms. In some examples, more than one browser advertisement platform may transmit a browser advertisement at various points in the browser advertisement's existence. For example, an ad tech company may create an advertisement and may then contract with a second ad tech company to run that advertisement on a variety of platforms. The second ad tech company may contract with a third ad tech company that specializes in ads placed in search results to display the advertisement alongside search results, contract with a social media platform to display the advertisement on social media pages, and/or contract with a browser game platform to display the advertisement alongside games. In this example, the original ad tech company, the second and third ad tech companies, the social media platform, and/or the browser game platform may all be examples of browser advertisement platforms.

The term "unique identifier," as used herein, generally refers to any string, tag, fingerprint, and/or other token that may be used to uniquely identify a browser advertisement. In some embodiments, a unique identifier may include an alphanumeric string, such as a cryptographic hash.

Association module 104 may associate the unique identifier with the browser advertisement in a variety of ways and contexts. For example, association module 104 may create and/or update an entry in a database that lists browser advertisements and associated unique identifiers. In examples where multiple browser advertisement vendors transmit a browser advertisement, each browser advertisement vendor may use an instance of association module 104 to associate a separate unique identifier with the browser advertisement. In some embodiments, association module 104 may generate the unique identifier before assigning the unique identifier to a browser advertisement.

At step 304, one or more of the systems described herein may transmit, by the browser advertisement platform, the browser advertisement to be displayed on at least one endpoint computing device in conjunction with the unique identifier. For example, transmission module 106 may, as part of computing device 202 in FIG. 2, transmit, by browser advertisement platform 208, browser advertisement 210 to be displayed on at least one endpoint computing device 206 in conjunction with unique identifier 212.

Transmission module 106 may transmit the browser advertisement in a variety of ways. For example, transmission module 106 may transmit the browser advertisement to one or more additional browser advertisement platforms en route to the endpoint computing device. In another example, transmission module 106 may transmit the browser advertisement directly to the endpoint computing device, for example by displaying the browser advertisement in a browser on the endpoint computing device.

In some examples, transmission module 106 may transmit a unique identifier of the browser advertisement platform in conjunction with the browser advertisement. For example, transmission module 106 may transmit the name of the browser advertisement platform and/or contact information for at least one administrator of the browser advertisement platform.

In some embodiments, transmission module 106 may transmit the browser advertisement to be displayed on at least one endpoint computing device in conjunction with the unique identifier by transmitting computer-readable code that includes the browser advertisement and a tag that includes the unique identifier. For example, transmission module 106 may transmit hypertext markup language (HTML) code that includes the text of the browser advertisement as well as a hidden tag such as "id" or "ad_id" that has a value set to the unique identifier for the browser advertisement.

Figure 4:
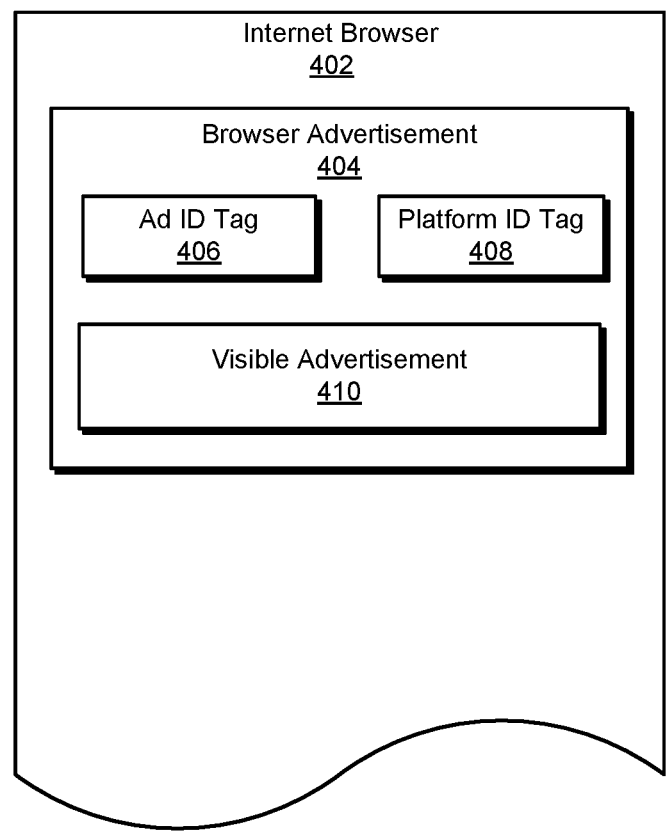
FIG. 4 is a block diagram of an example computing system for uniquely identifying malicious advertisements.

For example, as illustrated in FIG. 4, an Internet browser 402 may display a web page that includes a browser advertisement 404. Browser advertisement 404 may include a visible advertisement 410, such as an image, text, and/or a video, as well as an advertisement identifier tag 406 and/or a platform identifier tag 408. In some examples, advertisement identifier tag 406 may include a unique identifier of browser advertisement 404 while platform identifier tag 408 may include a unique identifier of the browser advertisement platform that transmitted browser advertisement 404. In some examples, a browser advertisement may have multiple nested layers of tags representing multiple browser advertisement platforms that have transmitted the browser advertisement on its way to the Internet browser.

Returning to FIG. 3, at step 306, one or more of the systems described herein may receive, at the browser advertisement platform, a message from the endpoint computing device that may include the unique identifier and that indicates that the browser advertisement was associated with malicious activity on the endpoint computing device. For example, receiving module 108 may, as part of computing device 202 in FIG. 2, receive, at browser advertisement platform 208, message 214 from endpoint computing device 206 that may include unique identifier 212 and that indicates that browser advertisement 210 was associated with malicious activity on endpoint computing device 206.

The term "message," as used herein, generally refers to any type of communication from the endpoint computing device to the browser advertisement platform. In one embodiment, the message may include an email. In another embodiment, the message may include a file upload to a website managed by the browser advertisement platform. Additionally or alternatively, the message may include an application message sent using an application that is installed on both the endpoint computing device and the browser advertisement platform.

The term "malicious activity," as used herein, generally refers to any type of unwanted and/or damaging activity directed at an endpoint computing device and/or a user of an endpoint computing device. In one example, malicious activity may include some type of malware, such as a virus or Trojan, that is launched, installed, and/or linked to by a browser advertisement. In another example, malicious activity may include fraud, such as a fraudulent advertisement that directs a user of the endpoint computing device to a scam website.

Receiving module 108 may receive the message in a variety of ways. For example, receiving module 108 may automatically scan a predefined email address for certain keywords that indicate a message from an endpoint computing device about a potentially malicious advertisement. In another embodiment, receiving module 108 may receive the message via an API designed to receive messages from endpoint computing devices about advertisements. Additionally or alternatively, receiving module 108 may monitor a file server for files uploaded by endpoint computing devices that include information about advertisements.

In some embodiments, receiving module 108 may receive the message from an endpoint protection application on the endpoint computing device that determined that the browser advertisement was associated with the malicious activity. For example, receiving module 108 may receive a message from an anti-malware application that determined that the browser advertisement was attempting to install and/or linked to malware.

In one embodiment, receiving module 108 may receive the message from a gateway device that transmitted the browser advertisement to the computing device. For example, a security application on a network gateway (e.g., a router and/or switch) may determine that the browser advertisement is potentially malicious and may send a message to receiving module 108.

In one embodiment, the message may include an identifier of the endpoint protection application and/or security application. Including the identifier of the application sending the message may enable the systems described herein to determine whether a single browser advertisement was reported in multiple instances or instead by multiple devices during a single instance. For example, if an endpoint protection application and a security application on a network gateway both report the same browser application as potentially malicious, receiving module 108 may use the application identifiers in the messages to determine that both messages originated from the same transmission of the browser advertisement. Additionally, if the systems described herein determine that a report of a browser advertisement as potentially malicious is a false positive, an application identifier may allow the systems described herein to inform the reporting application about the false positive.

In one embodiment, receiving module 108 may receive messages from the endpoint computing device that include the unique identifier and that include additional information about how the browser advertisement interacted with the computing device. In some examples, receiving module 108 may collect data about non-malicious browser advertisements. For example, receiving module 108 may receive information about legitimate views and/or clicks of browser advertisements by users.

At step 308, one or more of the systems described herein may perform, by the browser advertisement platform, a security action on the browser advertisement in response to the message indicating that the browser advertisement with the unique identifier was associated with the malicious activity. For example, security module 110 may, as part of computing device 202 in FIG. 2, perform, by browser advertisement platform 208, security action 216 on browser advertisement 210 in response to message 214 indicating that browser advertisement 210 with unique identifier 212 was associated with the malicious activity.

Security module 110 may perform a variety of security actions. In some examples, security module 110 may prevent the browser advertisement from being transmitted to additional endpoint computing devices. In one embodiment, security module 110 may prevent the browser advertisement from being transmitted by removing the browser advertisement from a list of browser advertisements that are intended to be transmitted. Additionally or alternatively, security module 110 may send messages to other browser advertisement platforms to remove the browser advertisement from rotation. In some examples, security module 110 may remove and/or blacklist other browser advertisements from the same source.

In one embodiment, security module 110 may perform the security action by informing an administrator of the browser advertisement platform about the potentially malicious browser advertisement. Additionally or alternatively, security module 110 may perform the security action by sending information about the browser advertisement to a security vendor that distributes the endpoint protection application. For example, if SYMANTEC ENDPOINT PROTECTION sent the message about the potentially malicious advertisement, security module 110 may send a message to a server hosted by SYMANTEC with information about the browser advertisement such as the content of one or more messages received about the browser advertisement and/or information about the source of the browser advertisement. In another embodiment, MCAFEE COMPLETE ENDPOINT PROTECTION may send the message about the potentially malicious advertisement and security module 110 may send a message to a server hosted by INTEL SECURITY with information about the browser advertisement.

In one embodiment, systems described herein may provide an API that may include information intended to enable security applications to detect the unique identifier. For example, the API may provide information about what tags within the browser advertisement contain the unique identifier. In another example, the API may provide information about the list of unique advertisement identifiers currently in use by the browser advertisement platform.

Figure 5:
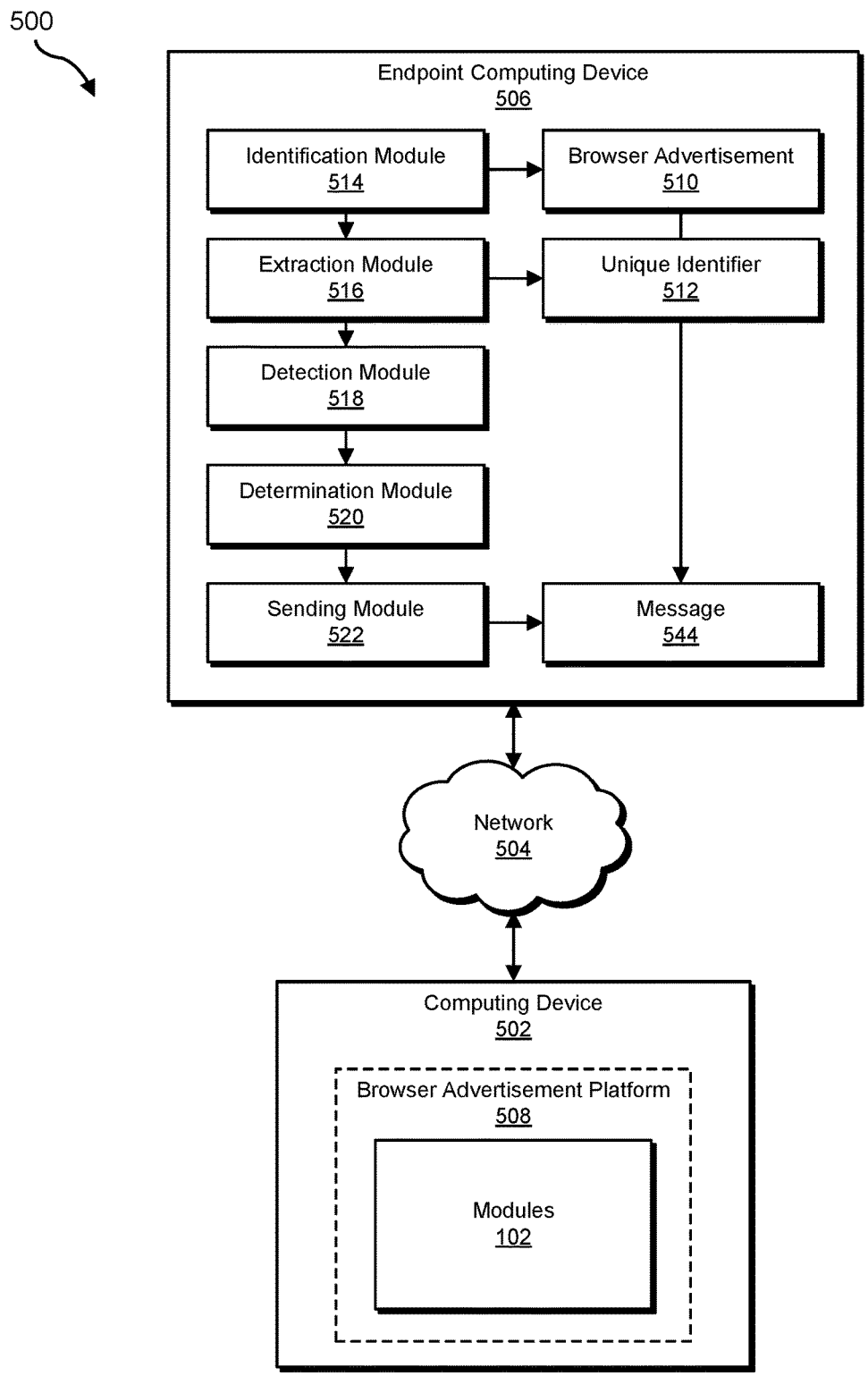
FIG. 5 is a block diagram of an example computing system for uniquely identifying malicious advertisements.

In some embodiments, some or all of the systems described herein may be part of an endpoint protection application on an endpoint computing device and/or gateway device. For example, as illustrated in FIG. 5, an endpoint computing system 506 configured with an endpoint protection application 509 may communicate with a computing device 502 that hosts a browser advertisement platform 508 configured with modules 102. In one embodiment, identification module 514 may, as part of endpoint protection application 509, identify a browser advertisement 510. Next, extraction module 516 may extract a unique identifier 512 from browser advertisement 510. Either before or afterwards, detection module 518 may detect malicious activity on the endpoint computing device 502. Next, determination module 520 may determine that browser advertisement 510 is associated with the malicious activity. Finally, sending module 522 may send a message 524 to browser advertisement platform 508 about the malicious activity that includes unique identifier 512. For example, an endpoint protection application may monitor all file activity and may detect that a known malicious process has been launched on the computing device. In this example, the endpoint protection application may trace the malicious process to a browser advertisement and then examine the browser advertisement for a tag with an advertisement identifier and/or a browser advertisement platform identifier. If the endpoint protection application finds the advertisement identifier, the endpoint protection application may send a message to the browser advertisement platform about the malicious processes launched by the browser advertisement with the unique advertisement identifier. In some embodiments, the endpoint protection application may query an API provided by the browser advertisement platform in order to determine the schema of the browser advertisement in order to locate the unique identifier within the browser advertisement. Additionally or alternatively, the endpoint protection application may query the API with the unique identifier to verify that the browser advertisement with the unique identifier was served by the browser advertisement platform.

Figure 6:
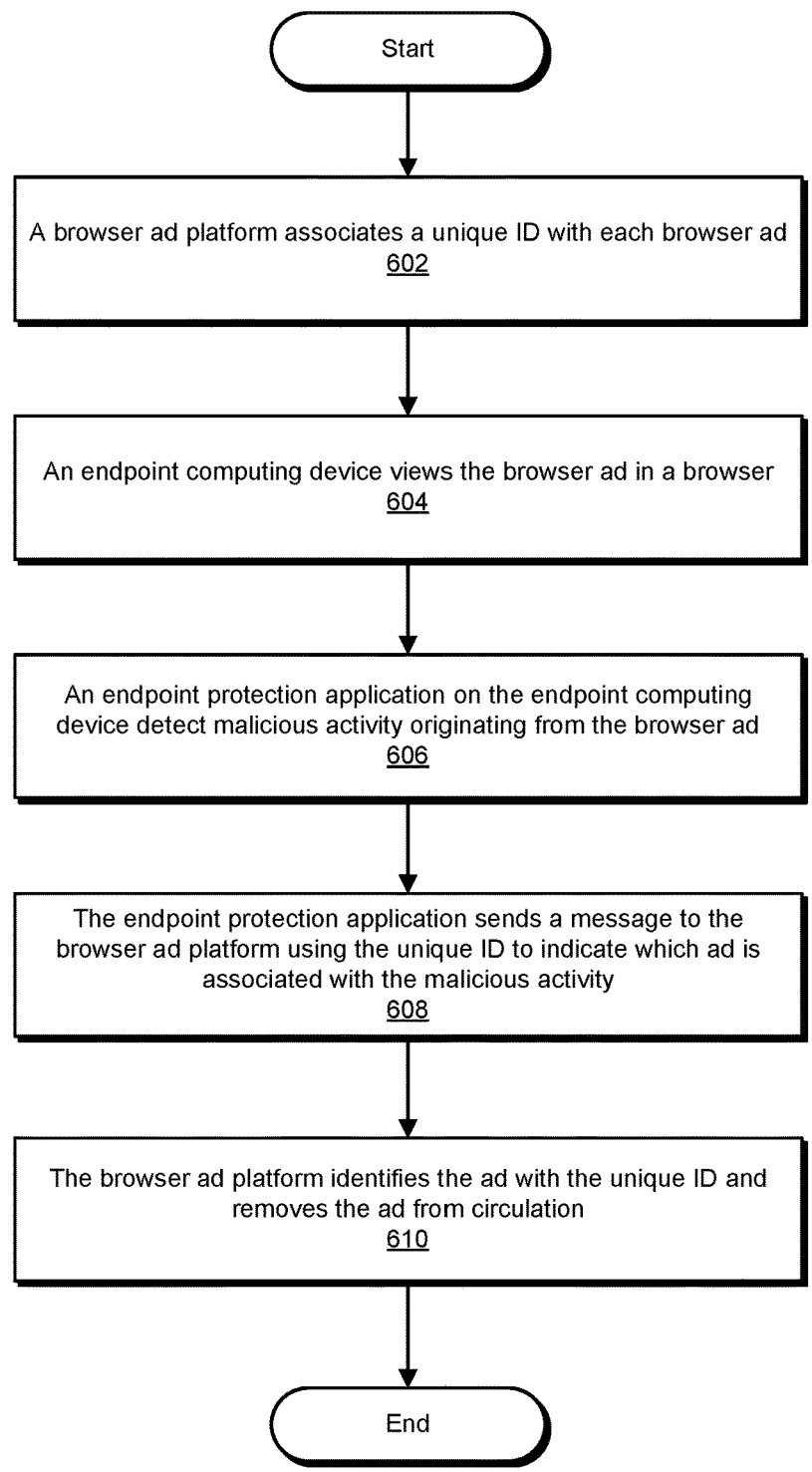
FIG. 6 is a flow diagram of an example method for uniquely identifying malicious advertisements.

In some embodiments, the systems described herein may work in conjunction across a browser advertisement platform and an endpoint protection application. For example, as illustrated in FIG. 6, at step 602, a browser advertisement platform may associate a unique identifier with each advertisement served by the browser advertisement platform. At some later time, at step 604, an endpoint computing device may view the advertisement in a browser. Next, at step 606, an endpoint protection application on the endpoint computing device may detect malicious activity originating from the browser advertisement. Either before or after detecting the malicious activity the endpoint protection application may detect the unique identifier for the browser advertisement. At step 608, the endpoint protection application may send a message to the browser advertisement platform using the unique identifier to indicate which advertisement is associated with the malicious activity. At step 610 the browser advertisement platform may identify the advertisement associated with the malicious activity by using the unique identifier and may remove the advertisement from circulation and/or perform other security actions.

As explained in connection with method 300 above, the systems and methods described herein consist of at least four components. First, the ad tech provider may generate a unique advertisement identifier for each advertisement impression that will be embedded in a pre-determined location, such as a defined parameter in a tag surrounding the advertisement itself. The advertisement identifier may also include an indicator of who the specific ad tech provider is.

Second, the security vendor control point (e.g., an endpoint protection application) may track these tags and include them in any metadata gathered and telemetry delivered regarding a detection of malicious or fraudulent activity. In some embodiments, it may also be possible for the systems described herein to gather this information for non-detection events to provide the ad tech vendor with a sample of visibility into their advertisement delivery.

Third, the security vendor may harvest this data on a regular basis (or in real time) and provide it to the relevant ad tech vendor along with data about the control point and product detecting the threat. In some examples, it may be the case that multiple ad tech vendors participated in the delivery of the advertisement.

The fourth may reside on the ad tech vendor's side where the systems described herein connect the data from the security vendor back to the ad tech vendor's own logs of advertisement impression deliveries. With the correlation in hand, ad tech vendors may be able to make business decisions about specific chains of advertisement delivery, identify patterns of fraudulent behavior, etc.

A possible fifth component of the systems described herein may include a set of public APIs whereby an ad tech vendor could register their set of advertisement identifiers with a security provider, provide details about the placement of the advertisement identifier in the information surrounding the advertisement and/or register to receive automatic notifications when their advertisements are involved in malicious behavior.

If ad tech vendors and security providers are able to match up their respective data, the systems described herein may enable an ad tech company to identify with certainty which of their advertisements are known to be associated with the delivery of malware, which advertisements are known to be associated with fraud and which advertisements are delivered to valid customers. Additionally, the ad tech vendor may provide feedback to the security provider regarding possible false positive detections or advertisement fraud attempts potentially indicating the presence of an infection on an endpoint.

Figure 7:
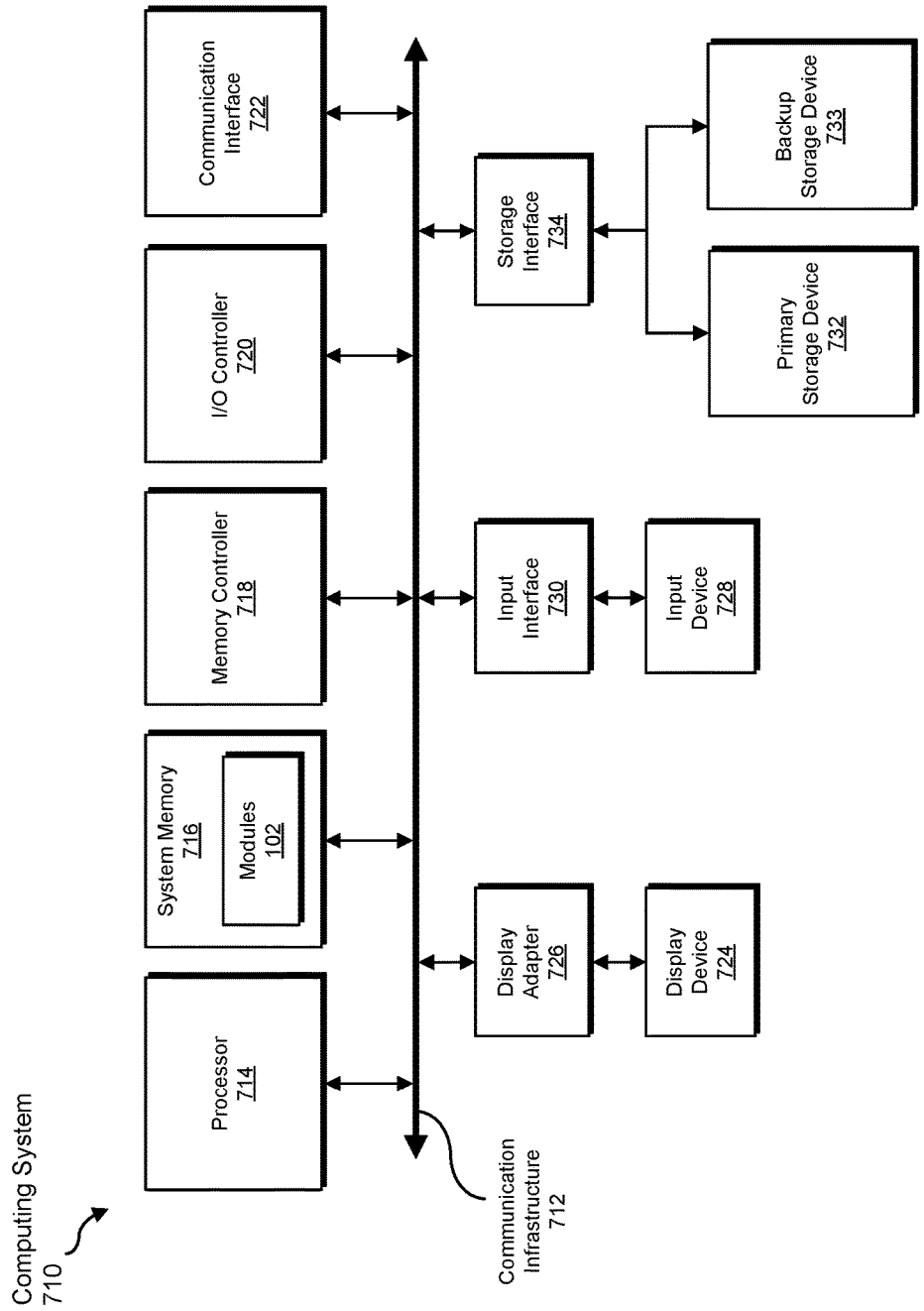
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to communication infrastructure 712 via an input interface 730. Input device 728 generally represents any type or form of input device capable of providing input, either computer or human generated, to example computing system 710. Examples of input device 728 include, without limitation, a keyboard, a pointing device, a speech recognition device, or any other input device.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
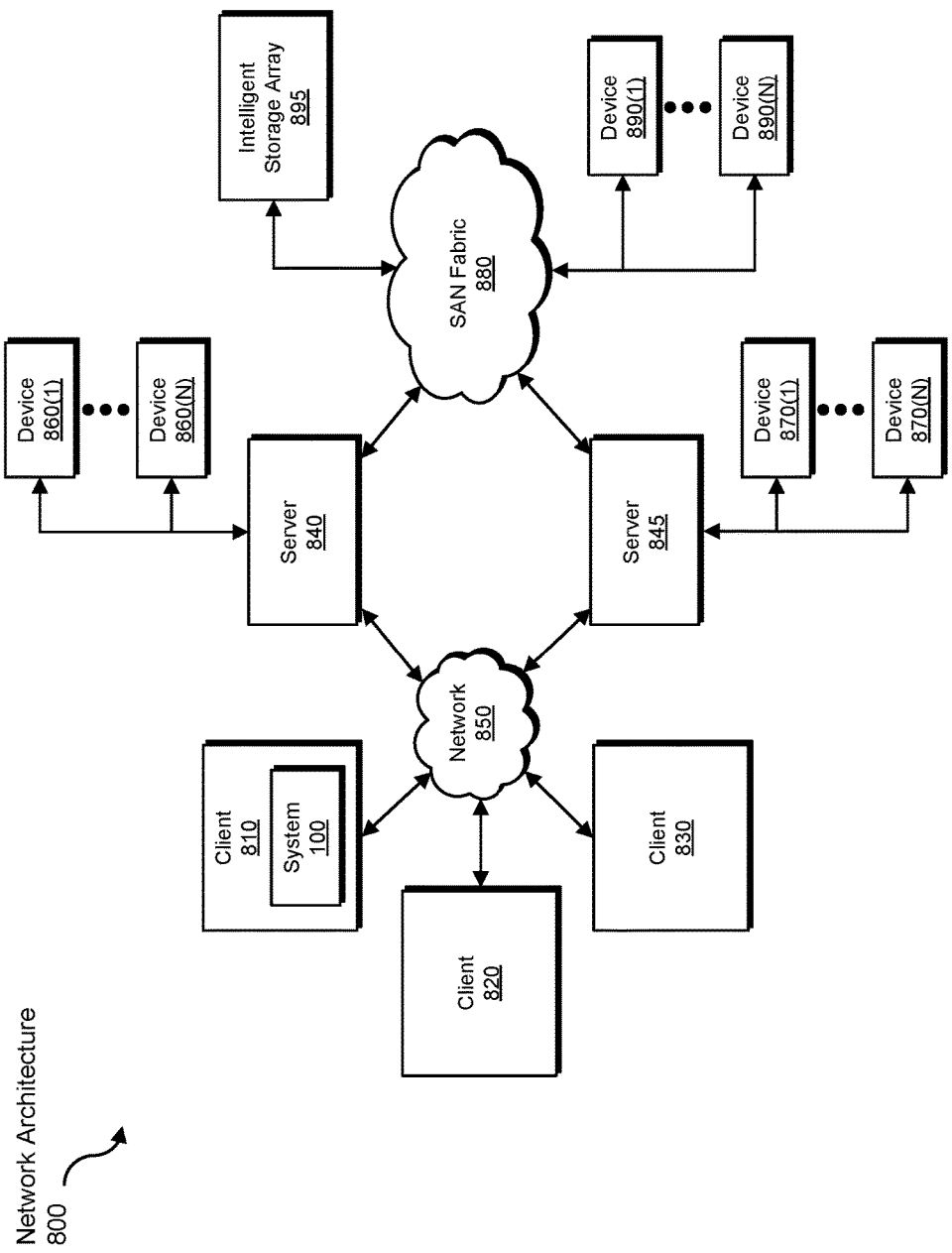
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for uniquely identifying malicious advertisements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive advertisement data to be transformed, transform the advertisement data by associating the advertisement with an identifier, output a result of the transformation to an advertisement transmission queue, use the result of the transformation to look up uniquely identified advertisements, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for uniquely identifying malicious advertisements, at least a portion of the method being performed by a computing device comprising at least one processor, the method comprising:

associating, by a browser advertisement platform, a browser advertisement with a unique identifier for the browser advertisement;

transmitting, by the browser advertisement platform, the browser advertisement to be displayed on at least one endpoint computing device in conjunction with the unique identifier;

providing, by the browser advertisement platform, an application programming interface (API) comprising information for the endpoint computing device to detect the unique identifier, the information comprising identification information for a tag containing the unique identifier located within the browser advertisement, wherein the browser advertisement comprises multiple nested layers of tags representing multiple browser advertisement platforms including the browser advertisement platform;

receiving, at the browser advertisement platform, a message from the endpoint computing device that comprises the unique identifier detected using the API and that indicates that the browser advertisement was associated with malicious activity on the endpoint computing device; and performing, by the browser advertisement platform, a security action on the browser advertisement in response to the message indicating that the browser advertisement with the unique identifier was associated with the malicious activity, wherein the security action comprises preventing the browser advertisement from being transmitted to additional endpoint computing devices by removing the browser advertisement from a list of browser advertisements that are intended to be transmitted.

2. The computer-implemented method of claim 1, wherein receiving the message from the endpoint computing device comprises receiving a message from an endpoint protection application on the endpoint computing device that determined that the browser advertisement was associated with the malicious activity.

3. The computer-implemented method of claim 2, wherein performing the security action comprises sending information about the browser advertisement to a security vendor that distributes the endpoint protection application.

4. The computer-implemented method of claim 2, wherein the message comprises an identifier of the endpoint protection application.

5. The computer-implemented method of claim 1, wherein transmitting the browser advertisement to be displayed on the at least one endpoint computing device in conjunction with the unique identifier comprises transmitting a unique identifier of the browser advertisement platform in conjunction with the browser advertisement.

6. The computer-implemented method of claim 1, wherein the identification information is intended to enable security applications to detect the unique identifier.

7. The computer-implemented method of claim 1, further comprising receiving, at the browser advertisement platform, from a gateway device that transmitted the browser advertisement to the computing device, an additional message that comprises the unique identifier and that indicates that the browser advertisement is potentially malicious.

8. The computer-implemented method of claim 1, wherein transmitting the browser advertisement to be displayed on the at least one endpoint computing device in conjunction with the unique identifier comprises transmitting computer-readable code that comprises the browser advertisement and the tag containing the unique identifier.

9. The computer-implemented method of claim 1, further comprising receiving, at the browser advertisement platform, an additional message from the endpoint computing device that comprises the unique identifier and that comprises additional information about how the browser advertisement interacted with the computing device.

10. A computer-implemented method for uniquely identifying malicious advertisements, at least a portion of the method being performed by a computing device comprising at least one processor, the method comprising:
identifying, by an endpoint protection application on an endpoint computing device, a browser advertisement received from a browser advertisement platform;
extracting, by the endpoint protection application, a unique identifier from the browser advertisement, wherein the unique identifier is associated by the browser advertisement platform with the browser advertisement;
detecting, by the endpoint protection application, malicious activity on the endpoint computing device, wherein the malicious activity is detected by an application programming interface (API), provided by the browser advertisement platform, the API comprising information for the endpoint computing device to detect the unique identifier, the information comprising identification information for a tag containing the unique identifier located within the browser advertisement, wherein the browser advertisement comprises multiple nested layers of tags representing multiple browser advertisement platforms including the browser advertisement platform;
determining, by the endpoint protection application, that the browser advertisement is associated with the malicious activity on the endpoint computing device; and
sending, by the endpoint protection application, a message to the browser advertisement platform that comprises the unique identifier of the browser advertisement detected using the API and that indicates that the browser advertisement was associated with the malicious activity on the endpoint computing device, wherein the browser advertisement platform, upon receiving the message from the endpoint protection application, prevents the browser advertisement from being transmitted to additional endpoint computing devices by removing the browser advertisement from a list of browser advertisements that are intended to be transmitted.

11. The computer-implemented method of claim 10, wherein extracting the unique identifier from the browser advertisement comprises:
identifying the API provided by the browser advertisement platform; and
querying the API provided by the browser advertisement platform to determine the location of the unique identifier within the browser advertisement.

12. The computer-implemented method of claim 10, wherein sending the message to the browser advertisement platform comprises:
identifying the API provided by the browser advertisement platform;
querying the API with the unique identifier to determine whether the browser advertisement was served by the browser advertisement platform; and
sending the message to the browser advertisement platform in response to determining that the browser advertisement was served by the browser advertisement platform.

13. A system for uniquely identifying malicious advertisements, the system comprising:
an association module, stored in memory, that associates, by a browser advertisement platform, a browser advertisement with a unique identifier for the browser advertisement;
a transmission module, stored in memory, that transmits, by the browser advertisement platform, the browser advertisement to be displayed on at least one endpoint computing device in conjunction with the unique identifier;
a receiving module, stored in memory, that receives, at the browser advertisement platform, a message from the endpoint computing device that comprises the unique identifier detected using an application programming interface (API) and that indicates that the browser advertisement was associated with malicious activity on the endpoint computing device;
a security module, stored in memory, that performs, by the browser advertisement platform, a security action on the browser advertisement in response to the message indicating that the browser advertisement with the unique identifier was associated with the malicious activity, wherein the security action comprises preventing the browser advertisement from being transmitted to additional endpoint computing devices by removing the browser advertisement from a list of browser advertisements that are intended to be transmitted, wherein the security module provides, by the browser advertisement platform, the AP comprising information for the endpoint computing device to detect the unique identifier, the information comprising identification information for a tag containing the unique identifier located within the browser advertisement, wherein the browser advertisement comprises multiple nested layers of tags representing multiple browser advertisement platforms including the browser advertisement platform; and
at least one physical processor configured to execute the association module, the transmission module, the receiving module, and the security module.

14. The system of claim 13, wherein the receiving module receives the message from the endpoint computing device by receiving a message from an endpoint protection application on the endpoint computing device that determined that the browser advertisement was associated with the malicious activity.

15. The system of claim 13, wherein the security module performs the security action by sending information about the browser advertisement to a security vendor that distributes an endpoint protection application.

16. The system of claim 13, wherein the transmission module transmits the browser advertisement to be displayed on the at least one endpoint computing device in conjunction with the unique identifier by transmitting a unique identifier of the browser advertisement platform in conjunction with the browser advertisement.

17. The system of claim 13, wherein the identification information is intended to enable security applications to detect the unique identifier.

18. The system of claim 13, wherein the receiving module receives, at the browser advertisement platform, from a gateway device that transmitted the browser advertisement to be displayed on the at least one endpoint computing device, an additional message that comprises the unique identifier and that indicates that the browser advertisement is potentially malicious.

19. A system for uniquely identifying malicious advertisements, the system comprising:
- an identification module, stored in memory, that identifies, by an endpoint protection application on an endpoint computing device, a browser advertisement received from a browser advertisement platform;
- an extraction module, stored in memory, that extracts, by the endpoint protection application, a unique identifier from the browser advertisement, wherein the unique identifier is associated by the browser advertisement platform with the browser advertisement;
- a detection module, stored in memory, that detects, by the endpoint protection application, malicious activity on the endpoint computing device, wherein the malicious activity is detected by an application programming interface (API), provided by the browser advertisement platform, the API comprising information for the endpoint computing device to detect the unique identifier, the information comprising identification information for a tag containing the unique identifier located within the browser advertisement, wherein the browser advertisement comprises multiple nested layers of tags representing multiple browser advertisement platforms including the browser advertisement platform;
- a determination module, stored in memory, that determines, by the endpoint protection application, that the browser advertisement is associated with the malicious activity on the endpoint computing device;
- a sending module, stored in memory, that sends, by the endpoint protection application, a message to the browser advertisement platform that comprises the unique identifier of the browser advertisement detected using the API and that indicates that the browser advertisement was associated with the malicious activity on the endpoint computing device, wherein the browser advertisement platform, upon receiving the message from the endpoint protection application, prevents the browser advertisement from being transmitted to additional endpoint computing devices by removing the browser advertisement from a list of browser advertisements that are intended to be transmitted; and
- at least one physical processor configured to execute the identification module, the extraction module, the detection module, the determination module, and the sending module.

20. The computer-implemented method of claim 1, wherein the security action further comprises removing other browser advertisements from a same source associated with the browser advertisement with the unique identifier.

21. The system of claim 13, wherein the security action further comprises removing other browser advertisements from a same source associated with the browser advertisement with the unique identifier.

* * * * *

UNITED STATES PATENT AND TRADEMARK OFFICE
CERTIFICATE OF CORRECTION

| | |
|---|---|
| PATENT NO. | : 10,320,816 B1 |
| APPLICATION NO. | : 15/185104 |
| DATED | : June 11, 2019 |
| INVENTOR(S) | : Spencer Smith |

Page 1 of 1

It is certified that error appears in the above-identified patent and that said Letters Patent is hereby corrected as shown below:

In the Claims

In Column 20, Line 46, Claim 13, delete "the AP" and insert -- the API --, therefor.

Signed and Sealed this
Sixth Day of August, 2019

Andrei Iancu
*Director of the United States Patent and Trademark Office*